United States Patent

[11] 3,595,088

| [72] | Inventor | Henry-Gilbert Meunier<br>Liege, Belgium |
|---|---|---|
| [21] | Appl. No. | 847,600 |
| [22] | Filed | Aug. 5, 1969 |
| [45] | Patented | July 27, 1971 |
| [73] | Assignee | Centre National De Recherches<br>Metallurgiques<br>Brussels, Belgium |
| [32] | Priority | Oct. 10, 1968 |
| [33] | | Luxembourg |
| [31] | | 57063 |

[54] METHOD AND APPARATUS FOR SAMPLING GRANULAR SOLID MATERIAL
3 Claims, 1 Drawing Fig.

| [52] | U.S. Cl. | 73/424 |
|---|---|---|
| [51] | Int. Cl. | G01n 1/20 |
| [50] | Field of Search | 73/424,<br>422, 423; 198/25 |

[56] References Cited
UNITED STATES PATENTS

| 1,448,758 | 3/1923 | Martin | 73/424 |
|---|---|---|---|
| 2,668,447 | 2/1954 | Lenhart | 73/423 X |
| 2,683,373 | 7/1954 | Gallup et al. | 73/422 |
| 3,006,367 | 10/1961 | Thompson et al. | 73/422 UX |
| 3,250,131 | 5/1966 | Jordison | 73/424 |

*Primary Examiner*—Louis R. Prince
*Assistant Examiner*—Daniel M. Yasich
*Attorney*—Holman and Stern

ABSTRACT: Granular solid material is continuously supplied to a surface by a suitable conveyor and is made to advance continuously over the surface, the surface having one or more openings which are periodically placed in the path of the material over the surface so that samples of the material fall through. The surface can have an antiadhesive coating. The sampled material is normally taken up continuously by a suitable conveyor which may include an inclined surface over which the samples are caused to advance to form a continuous train of sampled material. In a preferred form, the granular material is supplied to the upper surface of a drum which has its axis horizontal and has longitudinal gaps in its cylindrical surface. The drum is rotated so that material periodically falls in at the top of the drum and the sampled material within the drum periodically falls out at the bottom of the drum.

PATENTED JUL 27 1971 3,595,088
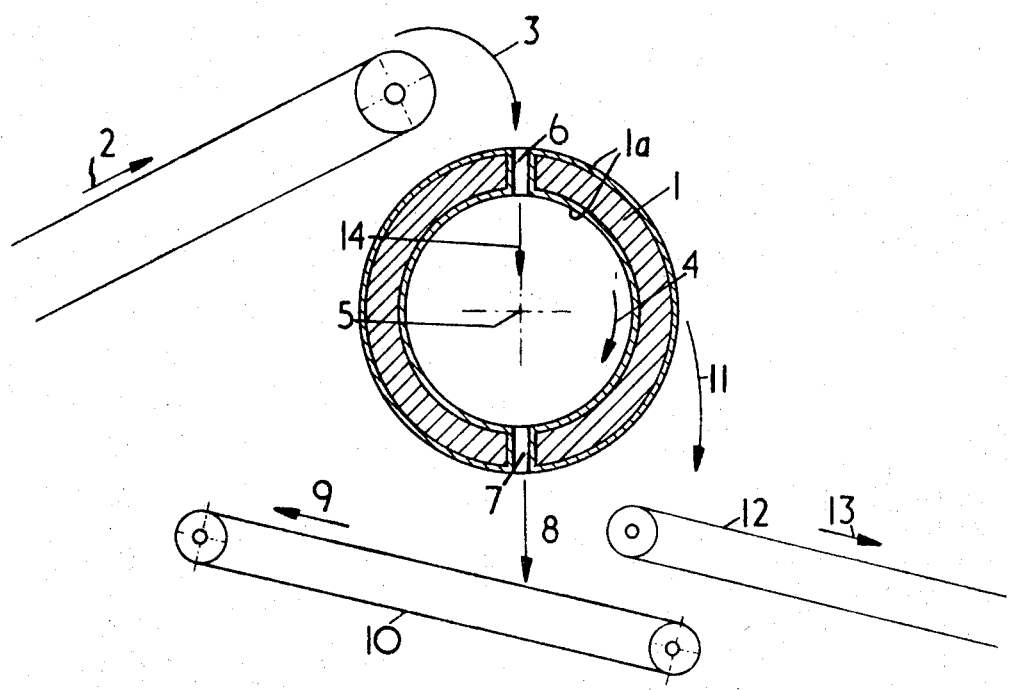
INVENTOR
HENRY GILBERT MEUNIER.
BY Holman, Glascock,
Downing & Seebold
ATTORNEYS

METHOD AND APPARATUS FOR SAMPLING GRANULAR SOLID MATERIAL

The invention concerns a method and apparatus for sampling granular solid material, such as for instance iron ore crushed more or less finely, or even pulverized.

The economic and rational realization of numerous industrial processes in which materials of a varied nature are subjected to transformations, modifications and/or physical or chemical reactions is conditioned in particular by the determination of quantities and qualities of the materials necessary for putting the process concerned in operation, and by the checking which one must normally carry out to ascertain whether the quantities and qualities of the material effectively utilized correspond satisfactorily to those estimated.

In the case, in particular, where the process is a continuous one in which at least one of the materials used is in solid and granular form and is capable of being put into operation also in a continuous manner, the problem of checking the quality of this material cannot in general be resolved except by periodic sampling, which in the standard process takes place on issue from a conveyor belt, a mixing drum, hopper and so on.

There are at present numerous devices both automatic and nonautomatic for carrying out such sampling; among these can be mentioned in particular devices based on the use of a scraper or small rake, by virtue of which sampling takes place in a direction perpendicular to the direction of advance of a conveyor belt charged with the material concerned. Bucket devices could also be mentioned, to which a reciprocating motion is frequently imparted.

If the sample taken is of an isolated nature or at any rate is of short duration, it is possible to operate under generally satisfactory conditions using these devices. On the other hand, if the problem to be solved consists for instance in supplying continuously an apparatus which is carrying out measurements on samples, or any manufacturing apparatus, the above mentioned devices are no longer suitable at all because of the essentially intermittent character of the manner in which the samples taken are made available. As an example, measurement apparatuses, the indications of which are intended to set in movement an automatic continuous regulating device, by reason of this fact, cannot themselves be supplied intermittently; it is essential to have recourse to a method by which it is possible to have available continuously samples taken intermittently.

Various methods have already been suggested to overcome these disadvantages and to effect this type of sampling. One of these methods consists in using a reservoir for the material, for instance a silo, placed between the spot where the sampling is carried out and the place where the continuous measurements are effected on the material. This method has the disadvantage of inadmissibly slowing down the measuring, so that knowledge and availability of the results are delayed making it impossible for the control or the subsequent regulation means to fulfill their task at the appropriate time.

Another method has been suggested to mitigate these defects, which consists essentially in increasing the sampling frequency to a substantial extent. This, however, brings out further disadvantages, e.g. the existence of a limit on the increase possible as a result of the mechanical inertia inherent in the sampling device, and the fact that too much material is withdrawn by these frequent samplings.

According to the invention there is provided a method of sampling granular solid material during its continuous passage, using a surface having at least one opening, the method comprising allowing the material to fall onto the surface, causing the material to advance continuously over the surface, and periodically placing the said opening in the path of the material so that samples of the material pass through the opening.

The fall of the granular solid material onto the surface may be free fall, or it may be braked, for instance by sliding.

The invention further provides apparatus for sampling granular solid material during its continuous passage, comprising a surface having at least one opening, conveyor means for supplying granular solid material to the surface, the surface being arranged so that granular solid material can advance continuously over the surface, and means for periodically placing the opening in the path of the granular solid material over the surface to allow samples of the said material to fall through the opening.

By proceeding in this way it is possible to reduce considerably the effects of inertia due to the movement of a sample taking device, since the sample itself takes virtually no part in any movement of the apparatus.

In accordance with an advantageous variation of the invention, the samples taken successively in this way are collected and gathered together on an inclined surface, the slope of which is profiled so as to allow the formation of an uninterrupted train of samples by successively contacting each sample with the preceding one, the continuous advance of the uninterrupted train of samples thus formed and its evacuation for instance to a suitable measurement device.

The continuous advance of the samples may conveniently be obtained by imparting a rotatory and/or vibratory or jolting movement to the inclined surface.

A preferred embodiment of the inventive apparatus comprises:

a. a device (for instance a conveyor belt) permitting the continuous pouring of the granular material which is intended to be sampled continuously;

b. a hollow rotary drum, substantially horizontal, the substantially cylindrical wall of which is pierced by at least one substantially longitudinal opening, suitably dimensioned and adapted to permit the passage of the granular material, the two ends of the cylinder being completely closed; and c. means for taking up samples issuing from the cylinder continuously;

the whole being arranged in such a manner that;

1. the device referred to in (a) pours granular material onto the cylinder, which is rotating about its axis;

2. as it rotates, the cylinder presents regularly its opening or openings in the path of the material being poured by the device (a) in such a manner that on each turn, a defined fraction of the said material penetrates into the cylinder through the opening or openings; and 3. the said fractions constitute samples of the material, which issue from the cylinder each time one of its openings is located in a low position, and these samples are collected by the means for taking up the samples.

In accordance with a variation of the apparatus of the invention, the device for receiving the samples is connected to a vibrating or jolting device, which has the aim and effect of smoothing out irregularities in the rate of flow at the outlet of the sampling cylinder.

Also, the external and/or internal faces of the cylinder may be provided with an antiadhesive coating facilitating the sliding of the granular material on and/or in the cylinder.

The dimensions of the gaps in the cylinder are to be determined in each case as a function of the dimensions of the particles of material and of the percentage of sample which one desires to take from the granular material. The sample taking cylinder generally rotates at low speed, this speed in general having little influence on the quantity of sample taken per unit of time.

The invention will be further described with reference to the accompanying drawings, the sole FIGURE of which diagrammatically illustrates one embodiment of apparatus in accordance with the invention.

Reference numeral 1 denotes the transverse section of a hollow cylindrical drum. The material to be sampled antiadhesive is fed onto the upper surface of the cylinder by means of a conveyor belt 2. An arrow 3 indicates the direction of flow of the material. The internal and external surface of the cylinder 1 have an antiadhesive coating 1a.

The cylinder 1 rotates in the direction of the arrow 4 about its longitudinal axis 5. At its periphery it has two diametrically opposed longitudinal gaps 6 and 7 which on each turn pass regularly under the dropping point of the material supplied by the belt 2.

When one or the other of these two gaps 6, 7 is located at the place where the material drops, a portion of this material penetrates (arrow 14) into the cylinder 1 through the gap and may issue from the cylinder 1 when one or the other of the two gaps is located in the lower portion of the cylinder. The sampled portion issuing from the cylinder (arrow 8) is taken up in the direction of the arrow 9 by a conveyor belt 10.

During sampling, the bulk of the material supplied by the belt 2 flows over the surface of the cylinder 1 and follows the general direction of the arrow 11 to a take up conveyor belt 12, and is evacuated in the direction of the arrow 13.

It is easy to see that the continuous rotation of the cylinder 1 provided with its two gaps enables on each complete turn of the cylinder two samples of the material supplied by the belt 2 to be taken automatically.

I claim:

1. Apparatus for sampling granular solid material during its continuous passage, comprising a substantially cylindrical hollow drum having closed ends and a plurality of longitudinal openings spaced about said drum communicating between the interior and exterior of said drum, the longitudinal axis of the drum being substantially horizontal; conveyor means arranged to supply granular solid material to the upper surface of the drum, whereby the material flows over a part of said upper surface and is discharged therefrom; and means for rotating the drum about its longitudinal axis to periodically place one of said openings into the discharge path of said material, whereby samples of granular solid material pass through said one of the longitudinal openings into the interior of the drum when the opening is rotated into said discharge path of said material and whereby the sampled granular solid material within the drum discharges from said one of the longitudinal openings when the opening is at its lowermost position.

2. Apparatus as claimed in claim 1, wherein two of said longitudinal openings are provided, disposed diametrically opposite each other.

3. Apparatus as claimed in claim 1, in which the internal and external surfaces of the drum have an antiadhesive coating.